(12) United States Patent
Hubbell

(10) Patent No.: US 6,361,028 B1
(45) Date of Patent: Mar. 26, 2002

(54) SOLID GIRDLE HOOP FOR AN AIR SPRING AND METHOD OF ASSEMBLY

(75) Inventor: Randall R. Hubbell, Indianapolis, IN (US)

(73) Assignee: Bridgestone/Firestone, Inc., Akron, OH (US)

( * ) Notice: Subject to any disclaimer, the term of this patent is extended or adjusted under 35 U.S.C. 154(b) by 0 days.

(21) Appl. No.: 09/291,881

(22) Filed: Apr. 14, 1999

(51) Int. Cl.[7] .................................................. F16F 9/04
(52) U.S. Cl. .............................. 267/64.27; 267/64.19; 29/896.9
(58) Field of Search .......................... 267/64.27, 64.19, 267/64.23, 122, 153; 29/896.9

(56) References Cited

U.S. PATENT DOCUMENTS

| | | | |
|---|---|---|---|
| RE20,887 E | 10/1938 | Mercier ........................ | 267/35 |
| 2,757,701 A | 8/1956 | Henson ....................... | 152/357 |
| 2,996,103 A | 8/1961 | Hollis et al. ................... | 154/1 |
| 2,999,681 A | 9/1961 | Muller et al. ................. | 267/65 |
| 3,667,707 A | 6/1972 | Mui .............................. | 248/20 |
| 4,029,305 A * | 6/1977 | Schubert et al. .......... | 267/64.27 |
| 4,039,354 A * | 8/1977 | Schober ...................... | 148/16.5 |
| 4,787,608 A | 11/1988 | Elliott ....................... | 267/64.27 |
| 5,005,808 A | 4/1991 | Warmuth, II et al. ..... | 267/64.27 |
| 5,180,145 A * | 1/1993 | Watanabe et al. ......... | 267/64.24 |
| 5,253,850 A | 10/1993 | Burkley et al. ........... | 267/64.24 |
| 5,580,033 A | 12/1996 | Burkley et al. ........... | 267/64.27 |

FOREIGN PATENT DOCUMENTS

| | | |
|---|---|---|
| DE | 29 04 521 A | 8/1980 |
| DE | 43 06 585 A1 | 9/1994 |
| GB | 1.198.448 | 6/1959 |
| GB | 861469 | 2/1961 |

* cited by examiner

Primary Examiner—Pam Rodriguez
(74) Attorney, Agent, or Firm—Thomas R. Kingsbury; Michael Sand; John H. Hornickel

(57) ABSTRACT

A fluid device such as an air spring includes a pair of parallel spaced end members and an elastomeric sleeve interposed therebetween to define a fluid pressure chamber therein. A girdle hoop is formed of cold rolled solid steel in a toroidal configuration and is molded into the elastomeric sleeve parallel and preferably spaced equidistant from the end plates.

7 Claims, 2 Drawing Sheets

SOLID GIRDLE HOOP FOR AN AIR SPRING AND METHOD OF ASSEMBLY

BACKGROUND OF THE INVENTION

1. Technical Field

The invention relates generally to fluid pressure devices and, more particularly, to fluid pressure devices employing a girdle hoop in an elastomeric sleeve. Specifically, the invention relates to a solid steel girdle hoop that reinforces the elastomeric sleeve of an air spring and to its method of installation.

2. Background Information

Flexible elastomeric sleeves are used in various types of fluid pressure systems and devices such as air springs, that are used as both vibrations isolators and actuators. These pneumatic devices or air springs are used in a variety of applications such as cushioning or isolating vibration between moving parts of a land vehicle to absorb vibrations and shock loads impressed on the vehicle axis by the wheels striking an object on the road or dropping into a depression formed in the road surface. Many of these devices also are used as actuators to provide movement between two parts of a machine or piece of equipment.

Most of these air springs have annular beads at the ends of a flexible elastomeric sleeve which form a fluid pressure chamber, with the beads being clamped or crimped onto rigid end members, end plates or pistons. Many such air springs additionally include a girdle hoop annularly disposed within the flexible elastomeric sleeve at approximately the midpoint thereof such that the girdle hoop is interposed between the end plates and substantially parallel therewith. Other air springs use two or more girdle hoops equally spaced along the length of the elastomeric sleeve between the end members. The end members are mounted on spaced portions of a vehicle or other equipment on which the air spring is mounted.

Girdle hoops are presently manufactured of a plurality of thin steel wires that together form a wound cable that has a high strength and is wound into a continuous ring that is then molded within the flexible sleeve to resist extreme outward expansion during heavy shock loading situations.

Examples of such air springs are shown in U.S. Pat. Nos. Re 20,887 and 5,580,033. Other prior art girdle hoops could be hollow tubes or rings such as shown in U.S. Pat. No. 2,999,681. Still another type of prior art girdle hoop is formed of a one-piece non-reinforced plastic ring such as shown in U.S. Pat. No. 4,787,608. Still another type of prior art girdle hoop as shown in a U.K. Patent No. 1198448, uses a girdle hoop formed of a hard rubber.

The annular end beads are internally reinforced with bead hoops that are wound of high strength wire in a fashion similar to that of the girdle hoop and are molded within the ends of the flexible sleeve to assist in maintaining the sleeve beads in an airtight sealing relationship with the end members.

Although these wound or woven reinforcement girdle hoops have been satisfactory for certain purposes, they are expensive and difficult to manufacture. Such hoops also suffer from the potential that one of the high strength wires used to manufacture the hoops might break, with the broken end of the wire often piercing the flexible elastomeric sleeve, thus resulting in a leak in the fluid pressure chamber and ultimate failure of the air spring.

The need thus exists for a girdle hoop that is inexpensive and easy to manufacture, that is strong, and will not puncture the elastomeric sleeve of the air spring. Such a girdle hoop will be manufactured of a solid ring of steel that can be molded into the flexible elastomeric sleeve of an air spring.

SUMMARY OF THE INVENTION

In view of the foregoing, an objective of the present invention is to provide a solid steel girdle hoop for a fluid pressure device wherein the girdle hoop is molded into a flexible elastomeric sleeve of an air spring.

Another objective of the present invention is to provide a solid metal girdle hoop that can be installed less costly than prior art girdle hoops in the flexible elastomeric sleeve of an air spring and which is inexpensive to manufacture.

A further objective of the present invention is to provide a solid metal girdle hoop that can be easily installed in the elastomeric sleeve of an air spring and which is stronger and more resistant to breakage or other fracture than many prior art girdle hoops.

Another objective of the present invention is to provide a solid metal girdle hoop that can be installed in the elastomeric sleeve of an air spring to reinforce a fluid pressure chamber formed therein and which obviates the risk that a broken wire will pierce the fluid pressure chamber.

Another objective of the present invention is to provide a solid metal girdle hoop that can be installed in the sleeve of an air spring and which has a lower profile than a stranded girdle hoop of comparable strength.

Another objective of the present invention is to provide an improved girdle hoop that is strong and can flex with the movements of the flexible sleeve into which it is molded and which absorb forces continuously exerted on the flexible sleeve without becoming brittle or breaking and which has sufficient flexibility and material memory permitting the hoop to return to its natural unstressed state.

A still further objective of the present invention is to provide a solid metal girdle hoop which is formed of a cold rolled standard carbon steel within the range of 1018 and 1070, AISI-SAE, and a preferred cross sectional diameter within the range of 0.170 and 0.193 inches for a ring having an external diameter of approximately 4 inches.

A further objective of the present invention is to provide such a solid metal girdle hoop in which the cross sectional thickness is substantially within the range of 4% to 5% of the outer diameter of the hoop.

Still another objective of the present invention is to provide an improved method of manufacturing the solid metal girdle hoop and installing it in the air spring.

These and other objectives and advantages are obtained by the improved girdle hoop of the present invention, the general nature of which may be stated as including a fluid pressure device including a pair of end members and an intervening elastomeric sleeve forming a fluid pressure chamber therein; and a girdle hoop disposed within said sleeve between said end members, said girdle hoop being formed of a solid steel material.

These and other objectives and advantages are obtained by the improved method for manufacturing an air spring containing a girdle hoop formed of a solid metal material, said method comprising the steps of forming a length of a solid metal material into a substantially toroidal member; bonding said toroidal member into an elastomeric sleeve of material; and mounting the elastomeric sleeve between a pair of spaced end members.

BRIEF DESCRIPTION OF THE DRAWINGS

The preferred embodiment of the invention, illustrative of the best mode in which applicant has contemplated applying the principles of invention, is set forth in the following description and is shown in the drawings and is particularly and distinctly pointed out and set forth in the appended Claims.

Similar numerals refer to similar parts throughout the drawings.

DESCRIPTION OF THE PREFERRED EMBODIMENT

Figure 3:
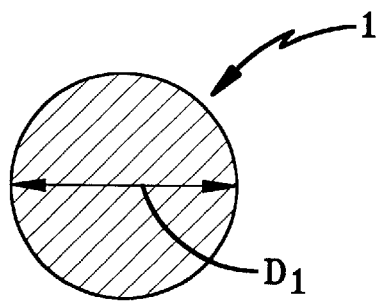
FIG. 3 is an enlarged sectional view of the girdle hoop of the present invention as taken along line 3—3 of FIG. 1.

The improved girdle hoop of the present invention is indicated generally at 1, and is an annular band or ring, preferably uniform in cross section as is shown in FIG. 3. Girdle hoop 1 has a thickness or diameter represented by $D_1$ and an outer diameter represented by $D_2$ compatible with the particular fluid pressure device with which it is intended to be used.

Figure 4:
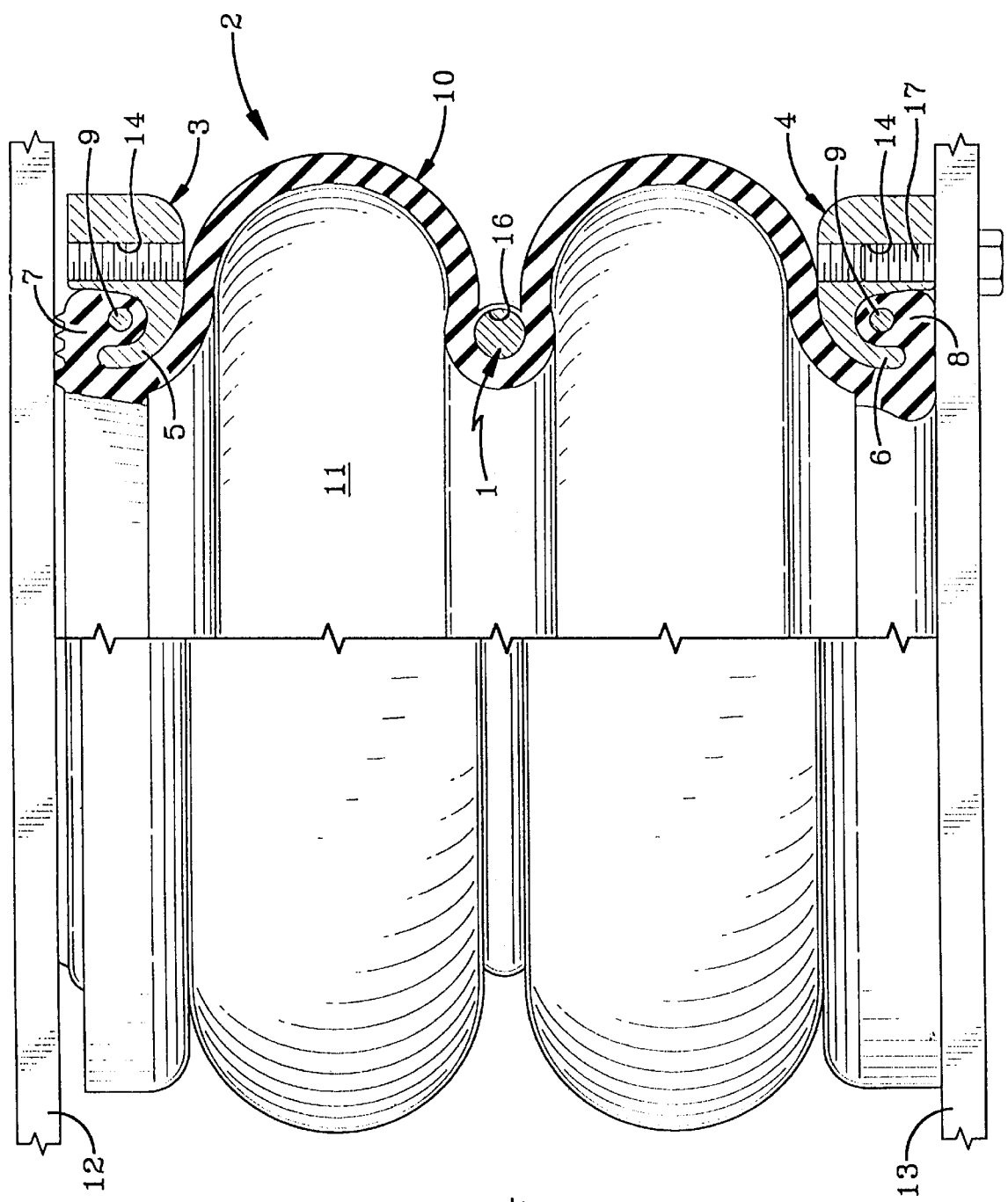
FIG. 4 is a front elevational view, partly in section, of an air spring that includes the girdle hoop of the present invention.

A usual fluid pressure device into which girdle hoop 1 is incorporated, is shown generally in FIG. 4. The fluid pressure device is an air spring 2 of the type known and understood in the relevant art, although other fluid pressure devices likewise known in the relevant art may employ girdle hoop 1 without departing from the spirit of the present invention. Air spring 2 includes an upper end member 3 and a lower end member 4 that are formed of stamped steel, plastic, aluminum or other types of rigid materials. These end members may have rolled ends 5 and 6, respectively, which are crimped about annular end beads 7 and 8, respectively, formed integrally on the ends of a hollow flexible elastomeric sleeve 10, such that end members 3 and 4 and sleeve 10 together form an internal fluid pressure chamber 11. End beads 7 and 8 preferably each include an annular bead hoop 9 therein.

Threaded holes 14 are formed in each of the end members 3 and 4 to permit air spring 2 to be attached to mounting plates 12 and 13, respectively, by bolts 17, only one of which is shown in FIG. 4, which are the movable components of the vehicle or other mechanism into which air spring 2 is installed. It is understood that end members 3 and 4 which are shown as being ring-shaped for illustrative purposes only may have configurations other than that shown in FIG. 4 without departing from the spirit of the present invention. Only mounting plate 13 is shown attached to end member 4 in FIG. 4.

In accordance with the main feature of the present invention, girdle hoop 1 is a toroidal-shaped ring of solid steel. Sleeve 10 is formed with a toroidal-shaped seat 16 sized to accommodate girdle hoop 1 which is disposed therein as set forth more fully below.

As is known and understood in the relevant art, sleeve 10 isolates shock loading from the vehicle or other mechanism into which air spring 2 is installed by compressing inwardly in response to compressive forces that compress end plates 3 and 4 toward one another. Girdle hoop 1 is manufactured of solid steel and possesses a far higher modulus of elasticity than sleeve 10. As such, the outward expansion of sleeve 10 is restrained by girdle hoop 1. As is understood in the relevant art, the relatively low modulus of elasticity of sleeve 10 and the internal fluid chamber, allows air spring 2 to isolate relatively small vibrations from the vehicle or other mechanism into which it is installed, and the relatively high modulus of elasticity of girdle hoop 1 reinforces sleeve 10 and prevents it from being excessively stretched outwardly from shock loading or high amplitude vibration.

Further in accordance with the main feature of the present invention, the solid configuration of girdle hoop 1 allows it to have a lower profile than that of a stranded girdle hoop of similar strength. Also, it is believed that a solid member of a given cross section has greater strength in tension than a stranded member of an equal cross section. The lower profile provided by the solid, unstranded girdle hoop 1 thus permits air spring 2 to compress further than an air spring having a stranded girdle hoop of comparable strength without air spring 2 "bottoming out" in response to severe shock loading. Also, it is understood that girdle hoop 1 could be of a non-circular cross section having even lower profiles such as elliptical, oval, etc. without departing from the spirit of the present invention.

Figure 1:
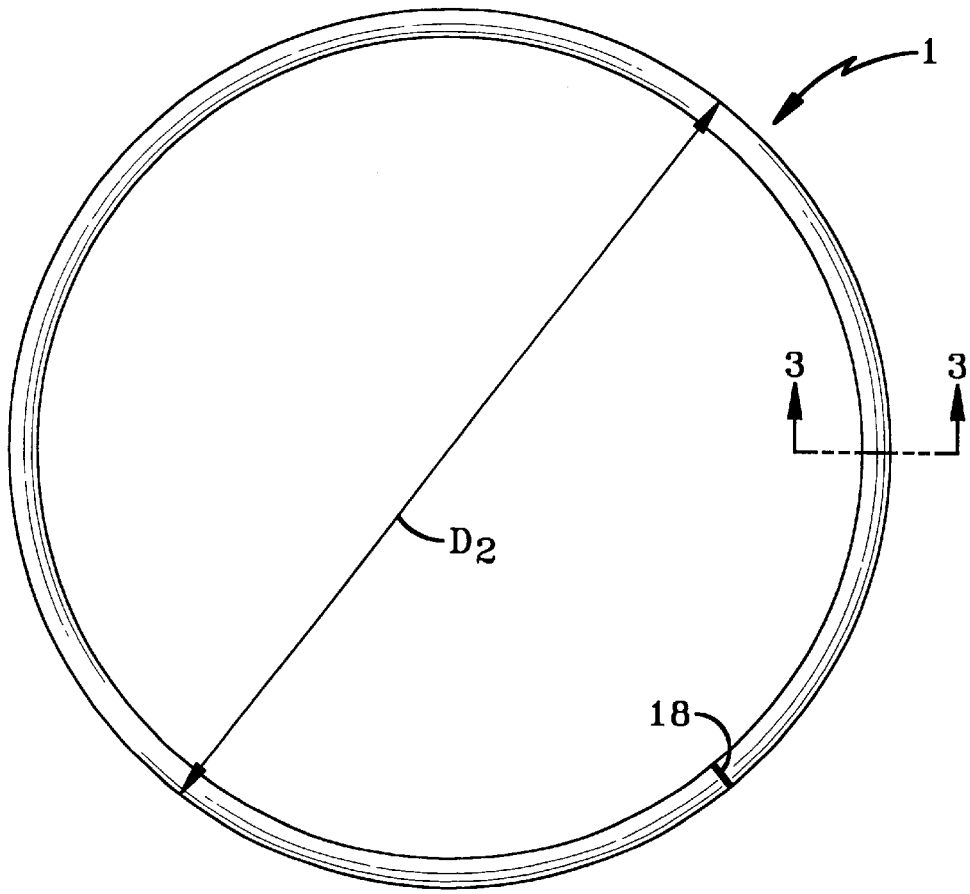
FIG. 1 is a top plan view of the girdle hoop of the present invention.
Figure 2:
FIG. 2 is a side view of the girdle hoop of the present invention.

Girdle hoop 1 is manufactured by bending a solid circular steel rod into a circular configuration, welding the ends thereof together as shown at 18 in FIG. 1, and grinding smooth the weld area 18 to provide a solid ring of substantially constant cross section. Inasmuch as girdle hoop 1 is manufactured of steel it can be welded with conventional welding methods such as arc welding or oxyacetylene welding, although other welding methods and appropriate non-welding joining methods can be used without departing from the spirit of the present invention. Girdle hoop 1 is thus manufactured by a process far more simple than that used to construct stranded girdle hoops inasmuch as the solid girdle hoop 1 of the present invention does not require the specialized wire weaving machinery that is ordinarily required to manufacture stranded girdle hoops. Also, it does not require expensive molding equipment as does girdle hoops of plastic.

Inasmuch as girdle hoop 1 is not of a stranded configuration but rather is of a solid, unstranded configuration, it can withstand repeated loading and vibration without the potential that a strand thereof might break. Such a broken strand would potentially pierce through elastomeric sleeve 10 into pressure chamber 11 with a corresponding failure of air spring 2. Since girdle hoop 1 contains no strands, such a failure is extremely unlikely to occur with girdle hoop 1.

It is understood that numerous known and understood methods in the relevant art exist for manufacturing solid rings of steel that are different than the method set forth above for manufacturing girdle hoop 1. Such alternate methods may be used to manufacture girdle hoop 1 without departing from the spirit of the present invention. Thus, girdle hoop 1 is easier to manufacture than a stranded hoop, thus resulting in savings of time, effort, and money. Moreover, girdle hoops 1 having non-circular cross sections (not shown) can be manufactured far more readily than a stranded hoop of non-circular cross section inasmuch as a non-circular solid steel girdle hoop can be manufactured by bending a steel rod of the desired non-circular section and welding the ends to make girdle hoop 1 or by manufacturing girdle hoop 1 of a circular cross section and then rolling girdle hoop 1 through compressive rollers until the desired non-circular cross section is achieved.

Once girdle hoop 1 has been welded and formed into a toroidal shape it is degreased and abraded by known methods. While in the preferred embodiment girdle hoop 1 is wheelabraded, it is understood that girdle hoop 1 could be abraded by any of a variety of known methods without departing from the spirit of the present invention.

Girdle hoop 1 is then coated with a primer such as CHEMLOK® 205, a trademark of Lord Corporation of Cary, N.C., USA, although other appropriate primers may be used without departing from the spirit of the present invention. After the primer is dry, girdle hoop 1 is coated with an adhesive such as CHEMLOK® 252X manufactured by Lord Corporation, although other appropriate adhesives may be used without departing from the spirit of the present invention. The primer and adhesive coatings help to bond girdle hoop 1 to the elastomeric material of sleeve 10.

Girdle hoop 1 is then molded into seat 16 of sleeve 10 by known methods. Having girdle hoop 1 molded into sleeve 10 helps to maintain the proper positioning of girdle hoop 1 with respect to sleeve 10 and further prevents girdle hoop 1 from being exposed to substances and environmental effects that may cause corrosion and the possible failure of air spring 2.

As is best shown in FIG. 4, it is preferred that girdle hoop 1 be disposed at approximately the midpoint of sleeve 10 such that girdle hoop 1 is interposed between end plates 3 and 4, substantially parallel therewith, and spaced an equal distance away from each. It is understood, however, that other configurations and positions for girdle hoop 1 are possible depending upon the particular application without departing from the spirit of the present invention.

The preferred embodiment of girdle hoop 1 is manufactured of cold rolled steel approximately in the range of 1018 to 1070, AISI-SAE Standard Carbon Steels, with the preferred range being between 1040 and 1070 so that the carbon content is in approximately the range of 0.35% to 0.70%.

In the preferred embodiment, girdle hoop 1 will have an outer diameter $D_2$ of approximately 4 inches with a cross sectional diameter $D_1$ preferably being within the approximate range of 0.170 and 0.193 inches thereby providing a solid steel metal hoop wherein the cross sectional diameter $D_1$ (FIG. 3) is between 4% and 5% of the outer diameter $D_2$ of the hoop.

The solid steel configuration of girdle hoop 1 thus provides substantial benefits beyond the stranded girdle hoops known and understood in the art. Specifically, girdle hoop 1 provides benefits such as cost savings, ease in manufacture, reduced profile, and enhanced reliability, as well as other benefits.

Accordingly, the improved girdle hoop apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the girdle hoop is constructed and used, the characteristics of the construction, and the advantageous new and useful results obtained; the new and useful structures, devices, elements, arrangements, parts, and combinations are set forth in the appended claims.

I claim:

1. A fluid pressure device including a pair of end members and an intervening elastomeric sleeve forming a fluid pressure chamber therein; and a girdle hoop disposed within said sleeve between said end members, said girdle hoop being of a substantially toroidal shape and formed of a solid steel material having a cross sectional diameter ($D_1$) which is between 4% and 5% of the outer diameter ($D_2$) of said hoop.

2. The fluid pressure device as set forth in claim 1 in which the outer diameter ($D_2$) of the girdle hoop is approximately 4 inches; and in which the cross-sectioned diameter ($D_1$) of the girdle hoop is within the approximate range of 0.170 and 0.193 inches.

3. The fluid pressure device as set forth in claim 1 wherein the solid steel material has a carbon content approximately in the range of 0.35% to 0.70%.

4. The fluid pressure device as set forth in claim 1 wherein the steel material of the girdle hoop is a cold rolled steel.

5. The fluid pressure device as set forth in claim 4 wherein the steel material of the girdle hoop is within the range of 1018 to 1070, AISI-SAE Standard Carbon Steel.

6. The fluid pressure device as set forth in claim 1 wherein the girdle hoop is interposed at a midpoint between the pair of end members.

7. The fluid pressure device as set forth in claim 1 wherein the girdle hoop is substantially parallel with and equidistant from the end members.

* * * * *